US011429827B2

(12) United States Patent
Nalbant

(10) Patent No.: US 11,429,827 B2
(45) Date of Patent: Aug. 30, 2022

(54) ELECTRONIC TAG DEVICE WITH COMMUNICATION MODULE AND ASSOCIATED METHOD

(71) Applicant: Bagid AS, Ålesund (NO)

(72) Inventor: Jan Vidar Nalbant, Oslo (NO)

(73) Assignee: Bagid AS, Ålesund (NO)

( * ) Notice: Subject to any disclaimer, the term of this patent is extended or adjusted under 35 U.S.C. 154(b) by 15 days.

(21) Appl. No.: 16/978,448

(22) PCT Filed: Mar. 6, 2019

(86) PCT No.: PCT/NO2019/050052
§ 371 (c)(1),
(2) Date: Sep. 4, 2020

(87) PCT Pub. No.: WO2019/172778
PCT Pub. Date: Sep. 12, 2019

(65) Prior Publication Data
US 2021/0049436 A1 Feb. 18, 2021

(30) Foreign Application Priority Data
Mar. 6, 2018 (NO) .................... 20180332

(51) Int. Cl.
*H04W 4/029* (2018.01)
*A45C 13/42* (2006.01)
(Continued)

(52) U.S. Cl.
CPC ..... *G06K 19/0723* (2013.01); *G06K 19/0704* (2013.01); *G06K 19/0717* (2013.01);
(Continued)

(58) Field of Classification Search
CPC .................................. G06K 19/0723
See application file for complete search history.

(56) References Cited

U.S. PATENT DOCUMENTS

2013/0241712 A1\* 9/2013 Motley, III ........ G06K 7/10009
340/10.51
2015/0122893 A1 5/2015 Warther
(Continued)

FOREIGN PATENT DOCUMENTS

AU 2017203837 A1 12/2017
EP 3 087 536 \* 9/2014 ............. G06K 19/06
(Continued)

OTHER PUBLICATIONS

NO 20180332, Norwegian Search Report, dated Oct. 5, 2018, 2 pages.
(Continued)

*Primary Examiner* — Joseph H Feild
*Assistant Examiner* — Pameshanand Mahase
(74) *Attorney, Agent, or Firm* — Kilpatrick Townsend & Stockton LLP

(57) ABSTRACT

An electronic tag device for cargo or baggage comprising a housing, a microcontroller, a memory, a wireless communications module, and a sensor module. The microcontroller is configured to receive itinerary data via the wireless communications module while the microcontroller is operating in a first mode and store the itinerary data in memory. The itinerary data may include at least a place of departure, a departure time, a place of arrival, and an arrival time. The microcontroller is further configured to enter a second mode based on at least one of the departure time in the itinerary and sensor data received from the sensor module, wherein the wireless communications module is disabled in the second mode, and return to the first mode based on at least one of the arrival time in the itinerary and sensor data received from the sensor module. The microcontroller will communicate with a remote system using the communica-
(Continued)

tions module while in the first mode and turn off all communication while in the second mode.

21 Claims, 5 Drawing Sheets

(51) Int. Cl.
G06K 19/07 (2006.01)
G06K 19/077 (2006.01)
H04W 4/02 (2018.01)

(52) U.S. Cl.
CPC . *G06K 19/07707* (2013.01); *G06K 19/07766* (2013.01); *H04W 4/027* (2013.01); *H04W 4/029* (2018.02)

(56) References Cited

U.S. PATENT DOCUMENTS

| | | | |
|---|---|---|---|
| 2017/0006573 A1* | 1/2017 | Kelly | G06K 19/07749 |
| 2017/0103292 A1* | 4/2017 | Reh | G06K 19/06112 |
| 2017/0223631 A1* | 8/2017 | Sen | H04W 52/0261 |
| 2018/0061344 A1* | 3/2018 | Kurokawa | G09G 3/367 |
| 2018/0152809 A1* | 5/2018 | Mei | H04L 67/22 |
| 2019/0026514 A1* | 1/2019 | Shiraishi | H04W 4/80 |
| 2019/0068301 A1* | 2/2019 | Getto | H04L 67/12 |

FOREIGN PATENT DOCUMENTS

| | | |
|---|---|---|
| EP | 3087536 A1 | 11/2016 |
| EP | 3091514 A1 | 11/2016 |
| EP | 2737820 A1 | 4/2017 |
| WO | 2011093780 A1 | 8/2011 |

OTHER PUBLICATIONS

PCT/NO2019/050052, International Search Report and Written Opinion, dated May 9, 2019, 14 pages.

\* cited by examiner

ELECTRONIC TAG DEVICE WITH COMMUNICATION MODULE AND ASSOCIATED METHOD

FIELD OF THE INVENTION

The present invention relates to an electronic tag device. More specifically the invention relates to an electronic tag device capable of reporting information, such as current, past and scheduled location.

BACKGROUND

Electronic tag devices may be used to track and trace objects, by being attached to an object, such as cargo or luggage. The tag device can be fitted with location detection capabilities, by using such as GPS, GSM localization or NarrowBand IoT (NB-IoT). The tag device may transmit a current location to an external server where the location information is stored and from where the current, past and scheduled location of the tracking device may be retrieved. A communication module, such as a GPRS module, may be used for transmitting the location information to the server. Electronic tag device may be capable of receiving data from external data sources. The received data may be stored in memory of the tag for later reference.

An exemplary use case of tag device is in the field of luggage tags. Luggage tags, also known as bag tags, baggage tags, baggage checks or luggage tickets, have traditionally been used by airline companies to route passenger luggage that is checked on to a final destination. Airline tags consist of a printed paper tag. The tag contains basic information such as the airline name, flight number, a digit code and the name of the airport of arrival, and a visual code such as barcode or QR-code. These bag tags are printed on an adhesive paper stock. This printed tag is then attached to the luggage at check in. This allows for automated sorting of the bags reducing the number of misrouted, misplaced or delayed bags. Automated sorting of baggage using automatic tag readers, reading machine-readable code on tags is standard at major airports.

One of the issues with the current airline tags is that luggage gets lost or mishandled. Most luggage sortation and processing systems at airports are based on visual bag tag data and codes printed on paper bag tags. The visual code scanners have to be "in line of sight" in order to be able to "read" the ID visual codes and get them on the right "track" for it to be loaded on the correct baggage carts. A reason why baggage gets lost is that the code on the bag tag is badly readable, e.g. due to damage to thermal printer heads or tears or folds in the luggage tag. As a remedy, tag device in the form of electronic luggage tags are being developed that include the visual code, or a representation thereof, as machine readable data.

Electronic tag device onboard of an aircraft the tags needs to be switched off while the aircraft is airborn. A solution is to manually switch off the tag's communication module, but this is time consuming and does not guarantee that the communication module will be switched off as it may be forgotten.

Apart from the issue of switching off the communication module in accordance with the airplane safety regulations, the tag is relatively vulnerable to damage when the tag is e.g. attached to a luggage and bumps against the luggage or other objects while being handled. There is a need for a solution for protecting the tag electronics against damage when attached to an object such as a luggage.

There also a need for protecting the tag for removal from an object while attached to the object, for preventing abuse of the tag.

A user of the tag can be at a location wherein the user is not familiar with communication selections and opportunities at the current location.

SUMMARY OF THE INVENTION

In order to address at least some of the needs discussed above an electronic tag device for cargo or baggage has been provided. The electronic tag device includes a housing, a microcontroller, a memory, a wireless communications module, a positioning module, and a sensor module including at least an accelerometer and an air pressure sensor. The microcontroller is configured to receive itinerary data via the wireless communications module while the microcontroller is operating in a first mode and store the itinerary data in memory. The itinerary data may include a place of departure, a departure time, a place of arrival, and an arrival time. The microcontroller is further configured to enter a second mode when at least one of the departure time in the itinerary and sensor data received from the sensor module indicates that the cargo or baggage is in transit, wherein the wireless communications module is disabled in the second mode, and return to the first mode when both of the arrival time in the itinerary and sensor data received from the sensor module indicates that the cargo or baggage is in transit. The microcontroller will communicate with a remote system using the communications module while in the first mode and turn off all communication while in the second mode. The sensor data is determined by the microcontroller to indicate that the cargo or baggage is in transit or is no longer in transit is based on positioning data, accelerometer data, and air pressure data.

In some embodiments of the invention the wireless communications module includes a first communication capability and a second communication capability, wherein the first communication capability is a wide area network capability which requires predetermined specification of communication parameters, and the second communication capability is communication capability which is capable detecting communication parameters from the environment and establish communication using the detected communication parameters. The microcontroller may further be configured to attempt to establish communication using the first communication capability based on parameters derived from the itinerary subsequent to returning to the first mode, and attempt to establish communication using the second communication capability if the attempt to establish communication using the first communication capability fails.

The predetermined specification of communication parameters may include at least one of a radio technology standard, a frequency, and a channel. The first communication capability may, for example, be an implementation of a narrowband IoT (NB-IoT). The second communication capability may, for example, be GPRS or EGPRS, or LTE, LTE-M or 5G.

In some embodiments the sensor module includes at least two sensors, including the accelerometer and the air pressure sensor, that are configured to monitor at least two physical parameters to which the tag is exposed, and the microcontroller is further configured to enter or remain in said second mode based on sensor data received from either one of said at least two sensors independently. This provides redundancy, which may be required in some situations, for example when the electronic tag is used on baggage transported with an airplane. It is, however, consistent with the invention to use only one sensor module, or to process input from the at least two sensors in combination instead of independently.

The sensor module may include at least one sensor chosen from the group consisting of: an accelerometer, a barometer a thermometer, photosensor, and a vibration sensor. The sensor module may also include a GSM sniffer which detects cellphone network signals.

In some embodiments the microcontroller is further configured to determine whether the sensor data indicates that the cargo or baggage is in transit or is no longer in transit based on at least one of: a detected acceleration profile, a detected change in pressure, a detected change in temperature, a detected change in light conditions, and a detected vibration profile.

An acceleration profile may be defined based on a particular threshold of acceleration, duration of acceleration above this threshold, a vibration pattern based on frequency, amplitude and duration, etc. Such an acceleration profile may be stored in memory and compared by the microcontroller, with sensor data received from the sensor module. Corresponding sensor profiles can be defined for other sensor types, such as rate of change in pressure, rate of change in temperature, rate of change in light conditions or duration of deviation from stable light conditions (e.g. indication light being turned on and off, doors or lids being opened and closed etc.). Aggregated sensor profiles can be defined as a combination of paterns of change in sensor data from several sensor types, and a metric defining a deviation or "distance" from a defined pattern.

An electronic tag device according to the invention may further comprise at least one antenna. It may also include a display module, and in some embodiments the display module has a screen cover in polycarbonate. The electronic tag device may include a power source, and this power source may be rechargeable. The positioning module may be a GPS module.

In some embodiments the housing comprises at least a device for establishing a connection between the microcontroller and a back plate. The back plate may include a rechargeable battery and a WIFI module. The microcontroller may then be configured to control the device to operate as a WIFI router using the cellular communications component.

The invention also provides a method for controlling a wireless communications module in an electronic tag device attached to cargo or baggage. The method may include such steps as receiving and storing itinerary data over the wireless communications module while operating in a first mode, the itinerary data may include a place of departure, a departure time, a place of arrival and an arrival time, monitoring output from a positioning module and a sensor module including at least an accelerometer and an air pressure sensor, entering a second mode when at least one of said departure time in said itinerary and sensor data received from the sensor module indicates that the cargo or baggage is in transit, wherein the wireless communications module is disabled in the second mode, and returning to the first mode when both of the arrival time in the itinerary and sensor data received from the sensor module indicate that the cargo or baggage is no longer in transit, and communicating with a remote system using the communications module while in the first mode and to turn off all communication while in the second mode. Determination that the sensor data indicates that the cargo or baggage is in transit or is no longer in transit can be made by the microcontroller based on positioning data, accelerometer data, and air pressure data.

In some embodiments of the method, the wireless communications module includes a first communication capability and a second communication capability, wherein the first communication capability is a wide area network capability which requires predetermined specification of communication parameters, and the second communication capability is communication capability which is capable of detecting communication parameters from the environment and establish communication using the detected communication parameters. The method may then further comprise attempting to establish communication using the first communication capability based on parameters derived from the itinerary subsequent to returning to said first mode, and attempting to establish communication using the second communication capability if the attempt to establish communication using the first communication capability fails.

In some embodiments the method further comprises attempting to establish communication using communication parameters associated with the place of arrival, and if that fails attempting to establish communication using communication parameters associated with the place of departure.

The method may also further comprise determining a location using the positioning module, obtaining communication parameters associated with the determined location from a table stored in local memory, and attempting to establish communication using the communication parameters obtained from the table.

One of the aspects of the invention is to enable an electronic tag to turn off the tag's communication module, or at least the transmitter. As a result of switching off the transmitter part of the communication module the tag may be used in environments where no transmission is permitted. An example of such environment is in an airplane when the doors are closed, in accordance with airplane safety regulations. As an additional effect battery consumption may be reduced by switching off the tag's cellular communication module, or at least the transmitter part thereof.

The term close proximity is to be understood as within a read range of a tag reader, which is typically within 100 meter. The read range in case of RFID depends on a number of factors, including the frequency of the radio waves uses for tag-reader communication, the size of the antenna, the power output of the reader, and whether the tag have a battery or is a passive RFID tag.

The tag data is data stored or storable in a memory of the electronic tag and which may be pre-stored or received from an external source. The tag data may be updateable via an external source. The tag data typically contains information that is meant to be output, e.g. via a display, via a wireless communication signal or audibly. Depending on its use case, the tag data may represent any information. The tag data contains for example information about the owner of the electronic tag. In another example, if the electronic tag is used as a bag tag, the tag data contains information such as the name of the airport of arrival, flight date, departure time, International Air Transport Association (IATA) airport code, the airline code and/or the flight number. The data included in the tag may in some embodiments be selected based on regulatory requirements, for example IATA regulations.

The indication of the current location may be obtained by the tag using:
  GSM triangulation techniques.
  Current and/or neighboring cell information obtained with the cellular communication module.

An indication of a location obtained in the one or more received signals.

A GPS module may be embedded in the tag device for obtaining a current location.

A module may be embedded in the tag device for obtaining WIFI based location information.

The communication module may be a cellular communication module, such as GSM, GPRS, UMTS, CDMA, CDMA-2000 or Narrowband-IOT (NB-IOT) or LTE CAT M1 communication module. The cellular communication module is capable of data communication with the first external server. A current location of the tag may e.g. be transmitted to the first external server for tracking and/or tracing purposes. When the tag is onboard an airplane, at least the transmitter part of the communication module is to be switched off. This is to avoid potential interference with onboard electronics of the airplane. The receiver part of the communication module may remain switched on, but may also be switched off or partly switched off together with the transmitter part.

The switching off of the transmitter part of the communication module may in some embodiments be triggered by an external signal and not only dependent on sensors. As a result the transmitter part of the communication module may be switched off earlier than would be the case if only using sensors. For example, if relying on an accelerometer in the tag to detect a taking off of the plane, the communication module would only be switched off when the airplane has already maneuvered along the runways and is in the process of taking off. It may be desirable to turn the transmitter off earlier than during takeoff. The signal from the external source is typically received in time to switch off the transmitter part of the communication module in accordance with the airplane safety regulations.

The electronic tag device can be powered by a battery, which may be embedded or detachably provided to the tag. The battery may be of a rechargeable type, as the battery most likely will require recharging regularly due to the power usage of its electronics.

An additional advantage of switching off the transmitter part of the communication module is that power usage may be reduced resulting in an extended battery life.

DETAILED DESCRIPTION

Figure 1:
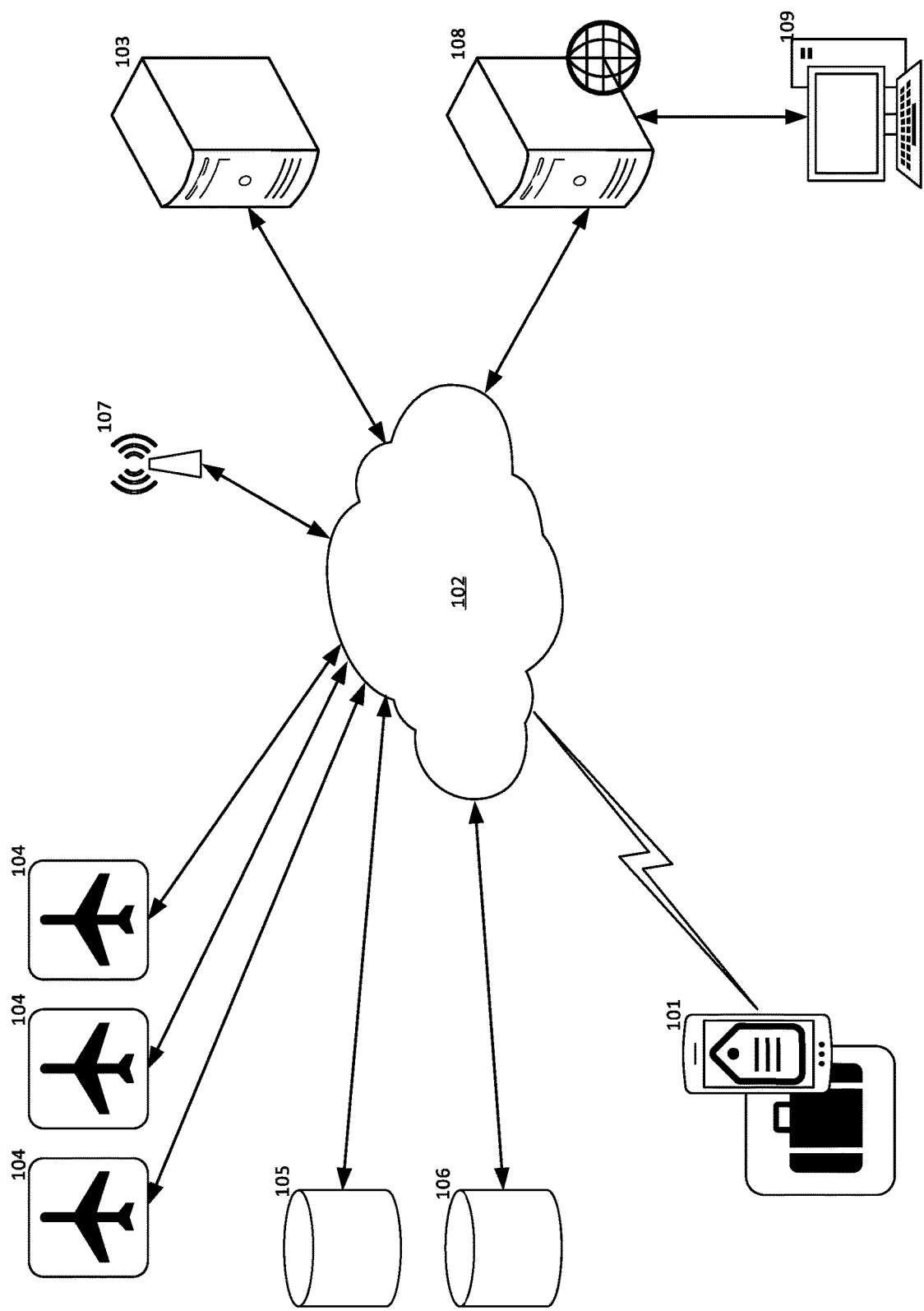
FIG. 1 is an overview of a system according to the invention.

In the following description of embodiments, reference will be made to the drawings, in which like reference numerals denote the same or corresponding elements. It should be noted that, unless otherwise stated, different features or elements may be combined with each other whether or not they have been described together as part of the same embodiment below. The combination of features or elements in the exemplary embodiments are done in order to facilitate understanding of the invention rather than limit its scope to a limited set of embodiments, and to the extent that alternative elements with substantially the same functionality are shown in respective embodiments, they are intended to be interchangeable, but for the sake of brevity, no attempt has been made to disclose a complete description of all possible permutations of features.

Furthermore, those with skill in the art will understand that the invention may be practiced without many of the details included in this detailed description. Conversely, some well-known structures or functions may not be shown or described in detail, in order to avoid unnecessarily obscuring the relevant description of the various implementations. The terminology used in the description presented below is intended to be interpreted in its broadest reasonable manner, even though it is being used in conjunction with a detailed description of certain specific implementations of the invention.

The embodiments described herein are examples based on airline travel. Airline travel is particularly relevant because of regulations relating to baggage tracking as well as radio communication. However, the invention is not limited to air travel and may equally well be utilized in the context of sea cruises, train travel or travels based on other means of transportation wherein loggage is handed over to the care of others at departure and returned to the passenger at arrival.

Reference is first made to FIG. 1 which shows an embodiment of a system capable of handling baggage information in accordance with the invention.

The system is based on tracking of electronic tags 101 which are attached to individual pieces of luggage, much like paper tags used by airlines today. The electronic tags include information relating to the origin and destination of the piece of baggage to which it is attached, and may also include other information. The tags 101 are capable of communicating wirelessly with other devices and to turn themselves on and off according to a schedule, sensor data or rules. Embodiments of the electronic tags will be described in further detail below.

The tags 101 are capable of communicating over computer and/or cellular networks. In the drawing such networks are illustrated as a cloud 102 intended to represent any combination of one or more communication networks.

The system further includes a back end server system 103 which is configured to handled status information for registered ID tags 101. Also connected are data systems belonging to participating airlines 104, as well as third party baggage handling systems 105 and other data sources 106. An example of a third party baggabe handling system that could provide information in a manner compatible with the principles of the present invention is the SITA World Tracer® tracing and baggage matching system. Other data sources 106 could be services providing timetable data.

Also included in the system are baggage scanners 107 that are located throughout the baggage handling system from the baggage drop off points, at various locations along conveyor belsts, chutes and sorting areas, and in baggage claim areas. These scanners will receive and register information from the electronic tags 101 and transmit them to the baggage handling system 105. In some embodiments of the invention the scanners are bar code readers that read bar codes displayed on a display of the electronic tag 101. In other embodiments the scanners are RFID readers reading date from an RFID transponder in the electronic tag 101. It is also possible to implement more than one solution for scanning of electronic tags, for example in order to be compatible with different systems installed at different airports.

A portal 108 may be a web server providing access to data stored in the back end server system 103. This portal may be accessed by other computer systems 109 for purposes of data analysis, baggage tracking, baggage sorting, Baggage Source Message (BSM), license plate number, etc. and as such it may primarily be utilized by airlines and airports. However, embodiments of the invention may be configured to allow end users, e.g. passengers, access to information related to their luggage. In other embodiments airlines, airports or other information providers can build services on top of their access to the portal 108 and provide such services to end users.

Figure 2:
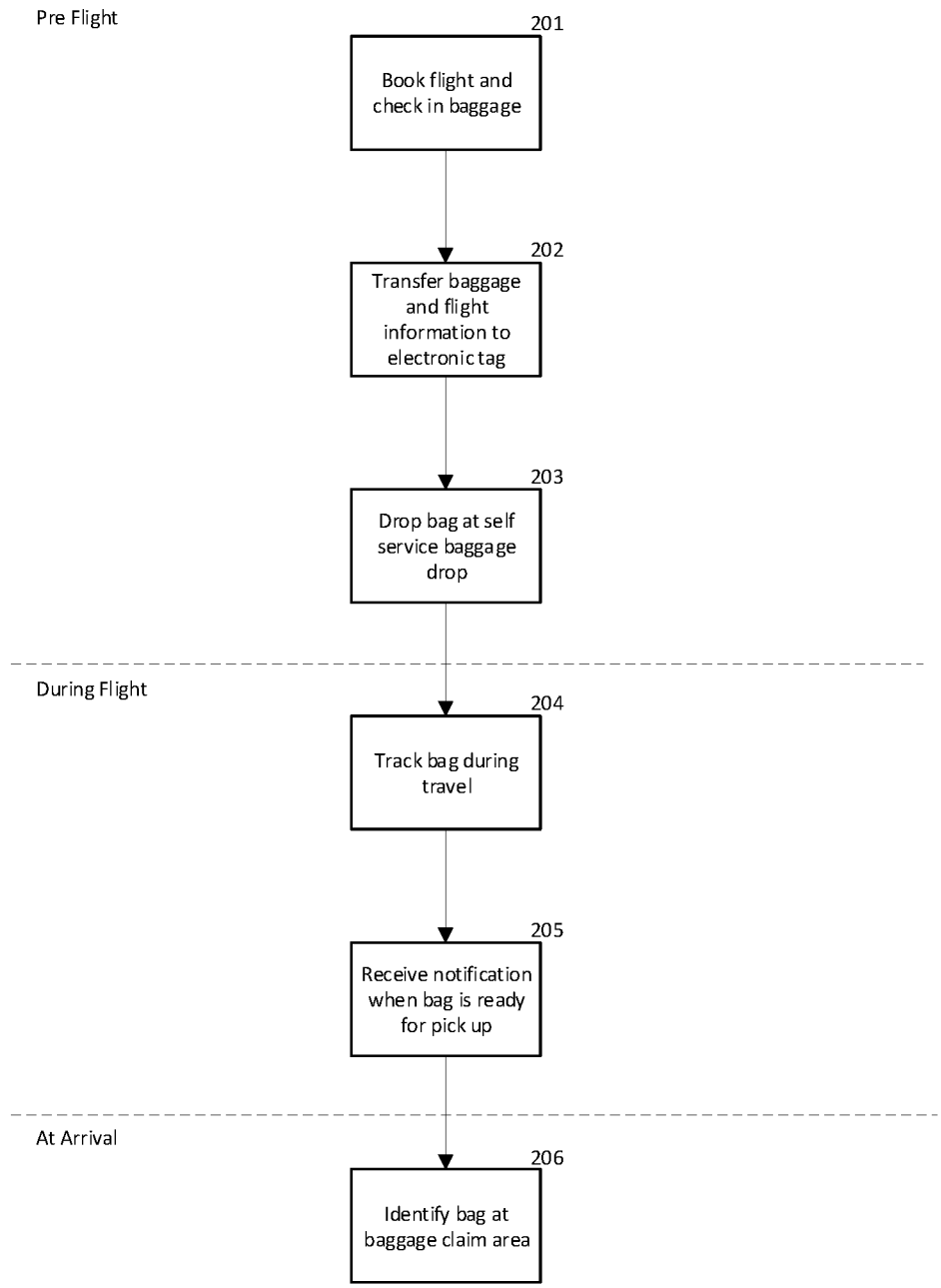
FIG. 2 is a flowchart of a baggage flow process as experienced by a passenger.

Turning now to FIG. 2 a flow chart is shown illustrating the desired flow of a baggage handling process from the point of view of a passenger. In a first step 201 the passenger books a flight with an airline and checks in baggage. When the baggage has been checked in relevant information is transferred to the electronic tags 101 over communication networks 102. This information may originate from the airline 104 and be transferred to the back end server 103 where it is associated with the appropriate electronic tags as identified by the passenger. From the back end server 103 the information is forwarded to the individual tags 101.

When the passenger arrives at the airport bags provided with electronic tags 101 may be dropped off at self service baggage drops 203. The information stored in the electronic tag 101 may be read at this point by appropriate equipment at the baggage drop point. This will be discussed in further detail below.

During the flight the passenger may be able to track the location of their luggage 204 provided that the system is configured to allow end users to access such data or additional services are provided on top of the web portal 108 as described above. Furthermore, when the passenger arrives at the destination the system may provide a notification service such that the passenger receives a notification when a bag with a tag is ready for pick up 205 in the baggage claim area. This may allow the passenger to relax, visit duty free shops or do other things that are more productive or enjoyable than waiting next to a baggage carousel.

At the baggage claim area the passenger will be able to identify their luggage by reading information on a display of the electronic tag 101, or by receiving a short range message from the tag 101, for example based on NFC and/or RFID technologies. In some embodiements near field or short range radio (e.g. Bluetooth) may be used to locate the baggage in the baggage area.

Figure 3:
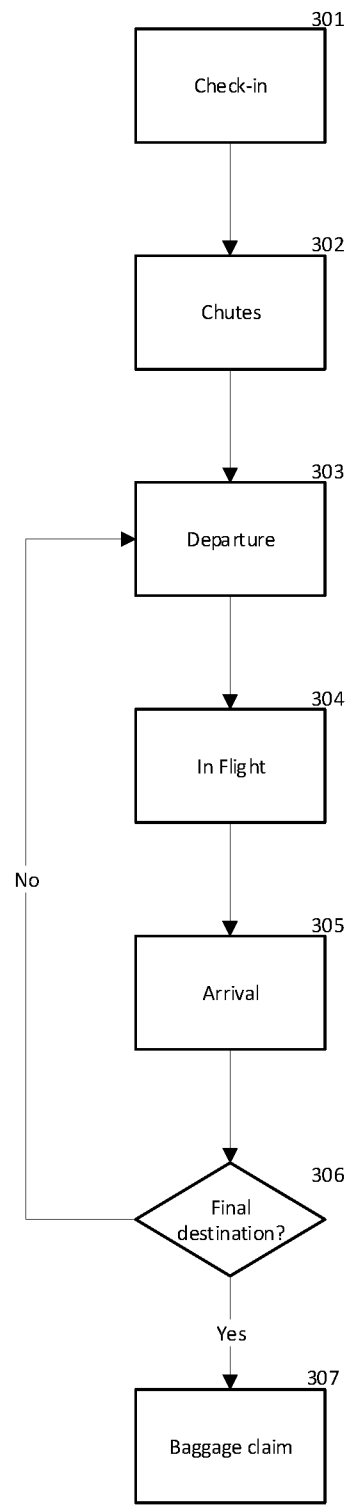
FIG. 3 is a flowchart of a baggage flow process from the point of view of baggage handling entities at the airport(s)

FIG. 3 is a flow chart illustrating a corresponding process, but from the point of view of the airlines and airports handling the baggage.

In a first step 301 the baggage is checked in. This is where the airline and/or airport takes over responsibility for the baggage and the point from where it is necessary to track the baggage's location. At this point the electronic tag is scanned and its location is entered into the back end server system 103. Following this the baggage is transported on conveyor belts and down chutes 302 to the departure area 303. In the departure area the baggage must be sorted and all and only baggage intended for a specific flight should be transferred to a given airplane. During this process it is necessary for the electronic tag 101 to remain online in order to facilitate identification and tracking.

After the baggage has been transferred to the cargo hold of the airplane, however, the baggage is in flight 304 and its location can be determined by the location of the airplane. Consequently, it is no longer required for the electronic tag to remain online and it may turn off in order to conserve power. More importantly, in embodiments such as the current example, where the baggage is transported by airplane, regulations require that radio communication functionality that is not explicitly permitted should be turned off. The electronic tag 101 should therefore be able to detect when it is in fligth and turn itself off. This functionality of the electronic tag 101 will be described in further detail below.

When the baggage arrives 305 at the destination it must again be sorted. If this is not the final destination, as determined in step 306, it must be brought to departure 303 in order to be transferred to the next flight on the schedule. If, on the other hand, it is determined in step 306 that this is the final destination, the baggage must be transferred to the appropriate baggage carousel in the baggage claim area.

In order to facilitate this handling it is necessary that the electronic tag 101 is capable of detecting that it is no longer in flight and turn itself back on. This capability will be described below.

Figure 4:
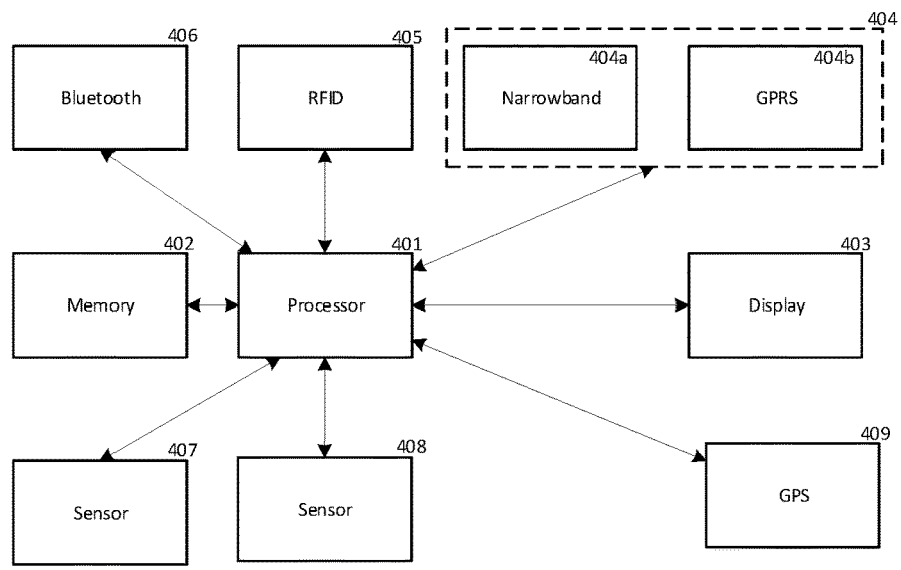
FIG. 4 is a block diagram of modules that may be included in an electronic tag according to the invention.

FIG. 4 is a block diagram illustrating the main components of an electronic tag 101 according to the invention. Those with skill in the art will realize that the various modules may be implemented as combination of hardware and software, and that general purpose hardware as well as application specific integrated circuits (ASICS) and field programmable gate arrays (FPGA) may be used. Details of standard electronic components, operating systems, internal communication in electronic devices, etc. are well known in the art and will not be discussed herein.

A microcontroller 401 is at the heart of the electronic tag controlling its operation based on instructions stored in a memory 402. The memory may also be configured to hold data relating to a flight, to the various communication capabilities, etc. as well as information about the passenger.

Some embodiments of the electronic tag 101 may also include a display 403. This may be an electrophoretic display (EPD) or some other form of electronic paper. However, more traditional display technologies such as LCD are also consistent with the principles of the invention. Some embodiments of the invention may exclude the display provided that the intended use does not require that the tag can be read by humans or bar code or matrix code readers.

A radio communication interface 404 may be a hybrid module including at least two communication capabilities, such as a Low Power Wide Area Network (LPWAN) 404a and GPRS 404b. The LPWAN may be Narrowband IoT (NB-IoT), for example LTE Cat M1. An example of a module that may be used in embodiments of the invention is the SARA-R412M-02B provided by u-blox of Thalwil, Switzerland. The SARA-R412M-02B is a hybrid LTE, EGPRS module for global use and with the following communications capabilities: Cat M1, Cat NB1 deployed bands: 2, 3, 4, 5, 8, 12, 13, 20, 28; EGPRS quad-band, 850/900/1800/1900 MHz.

In other embodiments other combinations of capabilities may be selected. Also, the two communication capabilities may be provided by separate modules instead of a single hybrid module.

In some embodiments additional communicaiton capabilities may be included, such as one or more of RFID 405, Bluetooth 406, and WiFi.

At least two sensor modules 407, 408 are included. The two sensor modules are s configured to monitor at least two physical parameters to which the electronic tag 101 is exposed. The two sensors 407, 408 may be an accelerometer and a barometer. However, any combination of two sensors that are individually capable of providing data that can be used to determine whether a communication capability (i.e. a radio interface) should be turned on or off may be used. Examples include photosensors, thermometers, vibration sensors, hygrometers, etc.

The operation of these sensors are described in further detail below.

Finally the elecronic tag may include a GPS module 409. The GPS module may be used to determine the geographical location of the electronic tag 101. This information may be used by the microcontroller to determine whether it is located where it is supposed to be located according to an itinerary stored in memory 402 or to look up preferred communication strategies for a given location based on a table of such information stored in memory 402. The GPS module is optional. If it is included it may be combined with none or any one or more of the other components that are described herein as optional. Location information may in some embodiments also be providec based on the communication interfaces 404, for example GSM triangulation techniques.

How the microcontroller 401 is configured to utilize location information provided by the GPS module 409 or the communication interface 404 does not depend on how the location information is provided.

Figure 5:
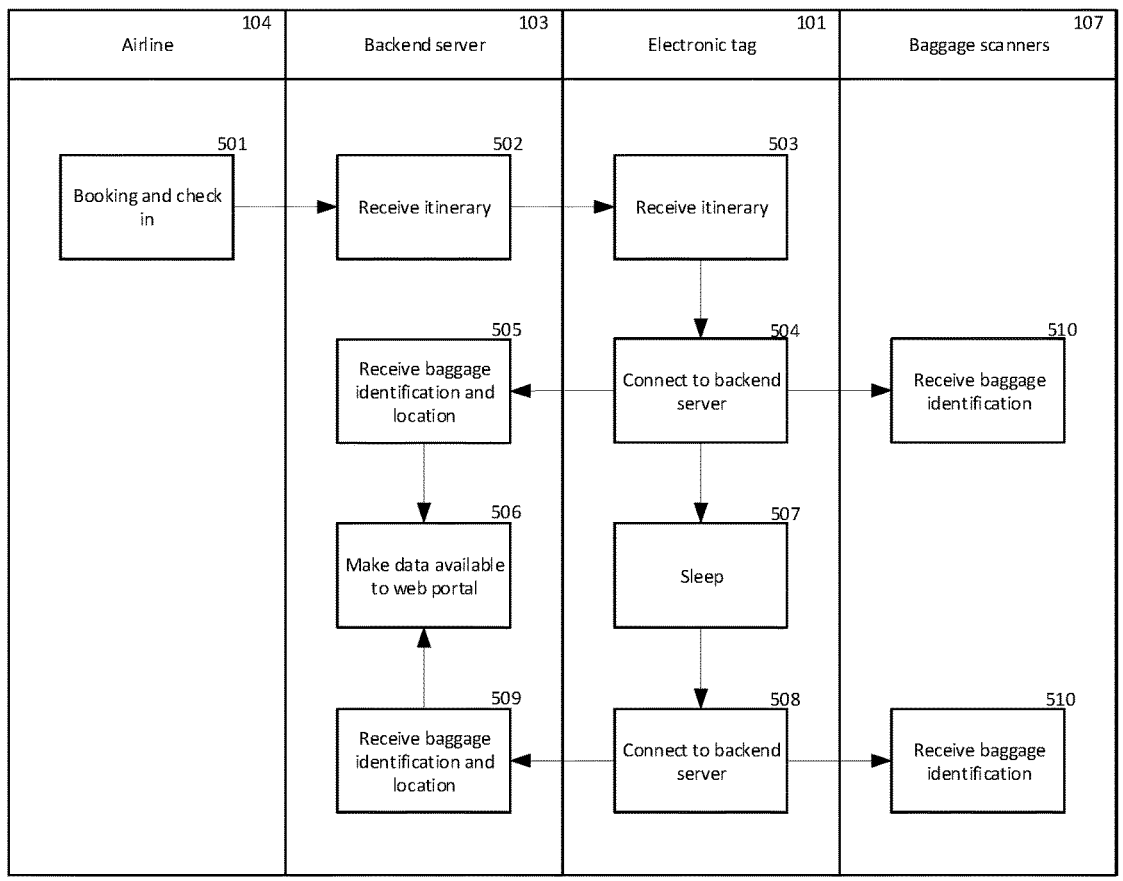
FIG. 5 is a signal flow diagram illustrating how information flows between some of the parts of a system according to the invention.

Reference is now made to FIG. 5 which is a flowchart illustrating the signal flow between some components of the system illustrated in FIG. 1. After a booking has been made with an airline 104 in step 501 itinerary information is transmitted from the airline server 104 to the backend server 103 where it is received in step 502. From the backend server the information is forwarded to the electronic tag 101, or to several electronic tags if the passenger has checked more than one bag. The electronic tag 101 receives the itinerary in step 503. Various additional information may also be included as will be described in further detail below.

At this point, or at a predetermined point in the future such as when the baggage is received at the baggage drop at the airport, the electronic tag may start transmitting updated information about its location to the backend server 103 as indicated in step 504. This may be repeated at regular intervals or whenever the electronic tag determines that its location has changed. Various methods for determining location are well known in the art, including GPS, GSM triangulation, WiFi location tracking, as well as other methods. Any suitable method known in the art may be included in an electronic tag 101 according to the invention and several methods may be combined for greater accuracy or flexibility.

When the backend server 103 receives baggage information and location from the electronic tag 101 in step 505 it may make this information available to the portal 108 from where this information may be utilized further, as described above.

When the electronic tag is in transit, e.g. during a flight, the tag enters a sleep mode in step 507. The tag remains in sleep mode 508 until it can verify that it can turn itself back on and reconnect to the backend server in step 508. When the tag 101 is in sleep mode not information can be transmitted or received. When the tag turns itself back on in step 508 it reconnects with the backend server and transmits a location update to the backend server 103. The backend server 103 receives updated location data in step 509 and again makes this information available to the portal 108 as step 506 is repeated.

Throughout this process the baggage will pass baggage scanners 107 which will scan information from the electronic tag and provide this information to the baggage handling system 105. In some embodiments of the invention the baggage handling system and the back end server 103 of the present invention may exchange information in order to increase accuracy or flexibility of the information available to each system. It is also consistent with the invention to combine the two systems, i.e. to have only one back end server which is both a baggage handling system for sorting and moving baggage, and a baggage tracking system for keeping track of baggage location at all times.

Figure 6:
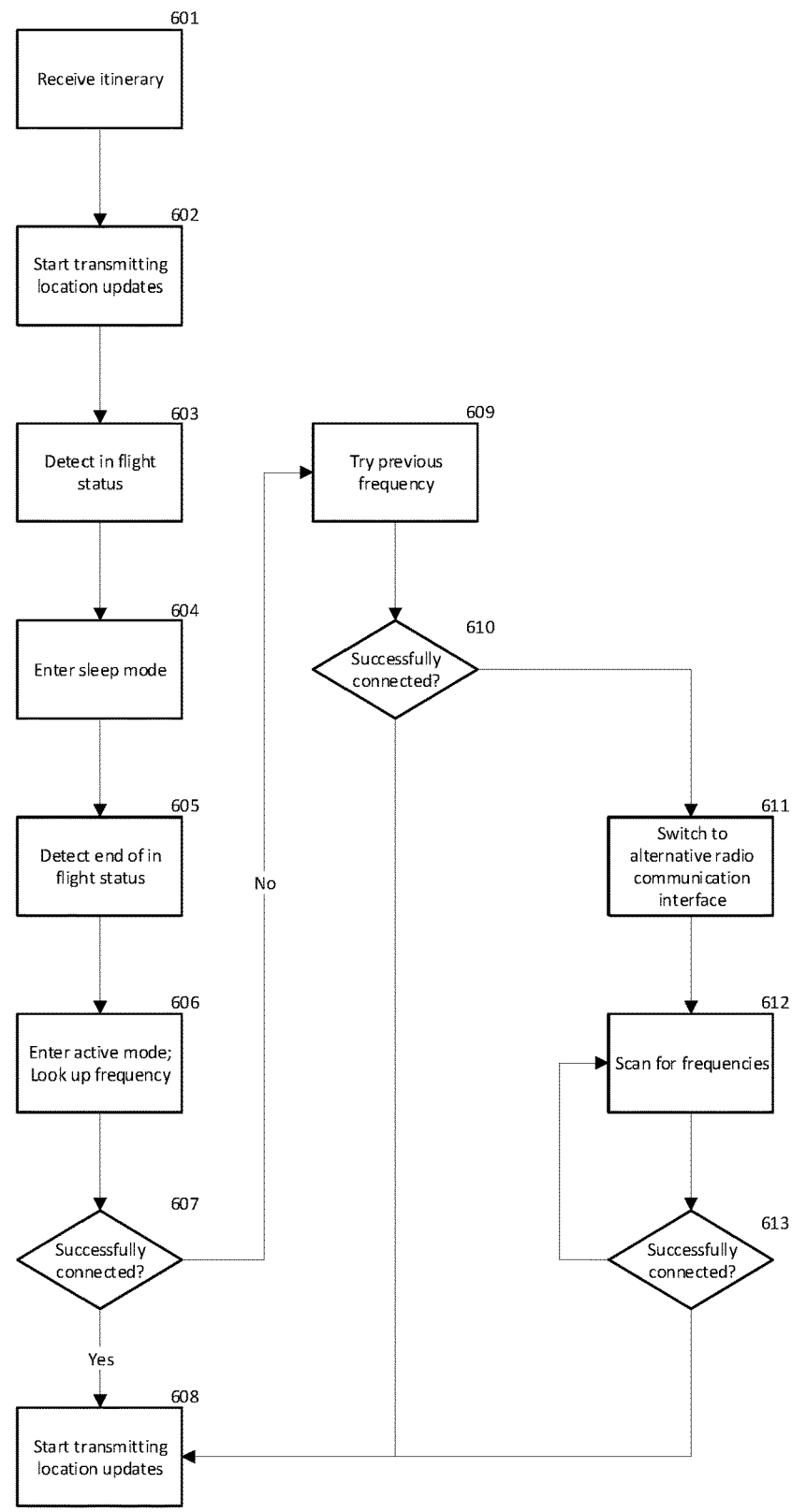
FIG. 6 is a flowchart illustrating a method performed by an electronic tag device according to the invention.

FIG. 6 is a flow chart illustrating a method that may be performed by an electronic tag 101 in accordance with the invention. In a first step 601 the electronic tag 101 receives an itinerary as described above. The itinerary may include an airport of origin, and airport destination, and any intermediary airports. The itinerary may also include a time schedule which specifies when the electronic tag is scheduled to be in flight, and therefore in sleep mode (or flight mode), and when it is expected to arrive at a destination and leave sleep mode. In some embodiments the itinerary may also specify communication modes to be selected at the various ariports, such as a specification of frequencies, or channels, to select when communicating using NB-IoT. In other embodiments the electronic tag 101 may already store a table of airports and associated communication modes in memory 402 and use the airports listed in the received itinerary to look up communication modes in this table.

Subsequent to receiving the itinerary, in step 602, the electronic module may enter a first mode where it connects to a wide area network and starts communicating with the back end server 103. Connection with the wide area network can be obtained according to the specification of communication mode associated with the airport of origin in the received itinerary. The communication with the back end server 103 may include location as determined by an available localization capability, as described above. In some embodiments additional sensor data and other status information may also be included.

When the itinerary specifies that the electronic tag is supposed to be in flight, as determined in step 603, it will leave the first mode and enter a second mode in step 604, which may be a sleep mode or flight mode wherein all radio communication capabilities are turned off. However, because flights may be delayed, baggage may be rerouted or other unexpected events may cause deviations from the itinerary, the microcontroller 401 continuously monitors output from the two sensors 407, 408 in order to detect conditions that indicate that the tag is in flight.

When it is determined in step 603, based on the itinerary, sensor output, or both, that the electronic tag 101 is in flight, sleep mode is entered in step 604 and the tag remains in this mode until it is detected in step 605 that it is no longer in flight. Again this can be based on the itinerary and sensor output.

Different rules may be implemented in order to determine whether the electronic tag 101 is in flight. The most conservative approach would be to turn radio communication off if itinerary or at least one sensor indicates that the tag is in flight. However, since delays and reschedules may permanently render the itinerary incorrect for the rest of the scheduled travel, rules may be implemented for allowing the tag to leave sleep mode even if the itinerary indicates otherwise provided that sensor output consistently indicates that the tag is not in flight, for example for a predetermined period of time.

In most embodiments the tag should not be allowed to leave sleep mode if at least one sensor indicates that it is still in flight mode.

After leaving sleep mode the electronic tag will determine communication mode for the location it is scheduled to be in according to the itinerary, either as specified in the itinerary or by searching for this information in a table in memory 402, as described above. It will then try to connect using this information and a first communication capability 404a. The first communication capability is one which requires relatively low power, but lacks the capability of searching for frequencies over which to communicate, which is why this information must be available to the tag when it leaves sleep mode.

If the electronics tag 101 successfully connects, as determined in step 607, communication with the back end server 103 can commence and location updates can be transmitted in step 608.

If it is determined in step 607 that the chosen communication capability did not result in successful connection, the tag may proceed in step 609 to try the communication capability that was active prior to entering sleep mode. This attempt may be successful if the flight has been delayed and the baggage is still at the originating airport. If it is determined in step 610 that this is the case, the tag will proceed to step 609 and again start transmitting updates to the backend server 103.

If it is determined in step 607 that communication is still unsuccessful, the electronic tag may fall back to an alternative radio communication interface 404b. This radio communication interface may be one that requires relatively more power, but includes the capability of searching for active communication base stations or access points. For example, the alternative radio communication interface 404b may use an earlier generation cellular communication technology, for example EGPRS. The tag will then scan for available frequencies in step 612. If communication can be established in this manner, as determined in step 613, the tag proceeds to step 608 and updates its location in the backend server 103. Otherwise it returns to step 612 and continues scanning for available communication links.

In some embodiments of the invention the microcontroller 401 is configured to use the location determined by one of the localization methods described above and override the location defined in the itinerary. The microcontroller 401 may then control the communication module 404 to try a communication mode that is not specified in the itinerary but is found in a table stored in memory 402.

Electronic tag devices according to the invention may include at least one antenna, and these may be integrated into the housing. Some embodiments include a display module in order to allow persons to read at least some of the content of the memory or in order to display bar codes or matrix codes for scanning. The display module may have a screen cover in polycarbonate.

An electronic tag device according to the invention may include or be configured to be connected to a power source, and this power source may be rechargeable. The housing may include at least a device for establishing a connection between the microcontroller and a back plate. This device may be a purely physical connection enabling attachment to and removal from a baggage item upon which the back plate is permanently fastened. However, the connection may also include electrical connection to an external power source such as a rechargeable battery or a battery charger, or to additional electronic components such as a WIFI module.

In an embodiment of the current invention the received signals is transponder signals. The external transponder may be located near or on an airplane. The tag device can further comprise a receiver configured to receive the transponder signal. The microcontroller can be configured to switch off at least the transmitter part of the communication module in response to the transponder signal where the transponder signal comprises a predefined data. The microcontroller can be configured to switch on at least the transmitter part of the communication module in response to receiving and detecting the predefined data.

In another embodiment the one or more signals can comprise a transponder signal. The one or more external sources can comprise a transponder of an airplane. The method can comprise switching off at least the transmitter part of the cellular communication module in response to receiving the transponder signal in the tag, if the transponder signal has a predefined relative strength in relation to one or more further transponder signals or if the transponder signal comprises first predefined data. The method can further comprise switching on at least the transmitter part of the cellular communication module in response to detecting a cessation of the transponder signal or if the transponder signal comprises second predefined data.

The airplane typically transmits the transponder signal already prior to departure. At the airport the tag may receive transponder signals from various airplanes, but when the tag enters the airplane the transponder signal from the entered airplane will be stronger than transponder signals from other airplanes. It may then be determined that the tag is onboard the airplane, which may trigger switching off of the transmitter part of the communication module.

In an embodiment the tag can comprise a clock module. The one or more signals can comprise time schedule data. The one or more external sources can comprise a second external data server. The communication module can further be configured to receive the time schedule data. The microcontroller can be configured to switch off at least the transmitter part of the communication module if a current time obtained from the clock module is within a predefined time from a departure time obtained from the time schedule data.

In another embodiment the one or more signals can comprise time schedule data. The one or more external sources can comprise an external data server. The communication module can be further configured to receive a time schedule data. The method can comprise switching off at least the transmitter part of the communication module if a current time obtained from a clock module in the tag is within a predefined time from a departure time obtained from the time schedule data.

The external server contains time schedule data, at least for the current flight. Complete time schedule data, including e.g. departure time and arrival time information, may be received by the tag. The tag may be configured to switch off the transmitter part of the communication module when according to the time schedule the airplane is scheduled for departure or at a predefined time prior to the scheduled departure to ensure that the transmitter part of the cellular communication module is switched off in time.

It is possible that the time schedule data includes a flight number (or another identifier of the current flight), which may be matched with a flight number obtained in a transponder signal from the airplane. This enables the time schedule information to include time schedule information from other flights.

In another embodiment the one or more signals can comprise neighboring cell information of a cellular network. The one or more external sources can comprise one or more base stations in the cellular network. The cellular communication module can be further configured to receive the neighboring cell information. The method can comprise switching off at least the transmitter part of the cellular communication module if the neighboring cell information is unchanged for a second predefined amount of time. The method can comprise switching on at least the transmitter part of the cellular communication module if the neighboring cell information changes in a third predefined amount of time. In cellular networks a cell is a part of the network covered by a base station. The neighboring cell information is typically received and used by the cellular communication module to track which base stations are available to potentially connect to for mobile communication.

While the tag is in range of a cellular network, the neighboring cells may change when the tag moves. For example, while the tag is transported to an airport or moved around on an airport the neighboring cell information may change.

If the transmitter part of the cellular communication module is on and the neighboring cell information stops changing for a predefined time, the tag may be onboard the airplane. This information may be used as a trigger to switch off the transmitter part of the cellular communication module.

As already mentioned, the tag device can further comprise a WiFi communication module. The one or more signals can comprise WiFi access point information of one or more WiFi networks. The one or more external sources can comprise one or more WiFi access points in the one or more WiFi networks. The microcontroller can be configured to switch off at least the transmitter part of the communication module if the WiFi access point information is unchanged for a predefined amount of time.

In another embodiment the one or more signals can comprise WiFi access point information of one or more WiFi networks. The one or more external sources can comprise one or more WiFi access points in the one or more WiFi networks. A WiFi communication module in the tag can be configured to receive the WiFi access point information.

The microcontroller can further be configured to monitor an operational state of the tag, such as sensors, and to switch off at least the transmitter part of the communication module in dependence of the operational state.

The sensors module may include a three axis accelerometer module configured to measure an acceleration rate. The microcontroller can be further configured to switch off at least the transmitter part of the communication module if the measured acceleration rate is below a first predefined acceleration threshold value for a predefined amount of time, which may be indicative of the tag not being moved in the predefined amount of time. The microcontroller can further be configured to switch off at least the transmitter part of the communication module if the measured acceleration rate is in accordance with a predefined acceleration pattern.

An acceleration pattern, or profile, may be defined based on a particular threshold of acceleration, duration of acceleration above this threshold, a vibration pattern based on frequency, amplitude and duration, etc. Such an acceleration profile may be stored in memory and compared by the microcontroller with sensor data received from the sensor module. Trigonometric calculations on the accelerometer data may be used to calculate directions. Gyrometric data may be combined with accelerometer data and may reduce or remove the need for trigonometric calculations. Additional sensor data may also be included if provided from the sensor module. A sensor data profile may thus be created based on combined sensor data from a plurality of sensors that may include some or all of an accelerometer, a pressure sensor (barometer), a gyroscope, a temperature sensor, as well as GPS positioning used with geo fencing, and GSM sniffer (cellular network detector). The combination of sensor data may be interpreted by the microcontroller to be indicating that the baggage or cargo is in transit when the combined sensor data input is sufficiently similar to expected sensor data while in transit based on a predefined metric.

In some embodiments the algorithm that compares sensor data with a predefined sensor profile—or the predefined profile (or profiles, which respectively represent different states such as rest, taxiing, takeoff, cruising, landing) itself may be updated. This may be done by collecting sensor data from many tags and using machine learning algorithms to refine detection.

The accelerometer is typically used as a safeguard to switch off the transmitter part of the communication module in case other triggers did not do so already. For example it may be detected that the tag device is not moving. In another example it may be detected that the tag is undergoing an acceleration from which it may be concluded that the airplane, wherein the tag is located, is taking off. In another example the accelerometer may be measuring acceleration rates in accordance with a predefined pattern, e.g. indicating vibrations of the airplane when taxiing or, over a longer period of time, movement of the tag along a baggage handling system followed by loading baggage with the tag device onboard an airplane.

The tag data may also include geo-fencing data. The geo-fencing data can define one or more geographical locations or areas where the transmitter part of the communication module is to be switched off. The tag can further comprise a GPS receiver to obtain the current geographical location. The microcontroller can further be configured to compare the geo-fencing data with the current geographical location to obtain a comparison result. The microcontroller can further be configured to switch off the transmitter part of the communication module based on the comparison result.

The geo-fencing data may be in the form of longitude and latitude coordinates defining the edge of a geographical area. If the tag detects that it is within this geographical area it may be triggered to switch off the cellular transmitter. The geographical area is for example defined as the area between the gate and the airplane, which causes the transmitter to switch off at the gate.

The communication module can be configured to receive the tag data from an external data server. This enables the tag data to be received and/or updated remotely. By using the communication module, the source of the tag data and the electronic tag device need not be in close proximity. The tag may further be configured to pair with a mobile device, such as a mobile phone, smartphone or tablet, using WIFI or a short distance communication protocol, such as Bluetooth or low energy Bluetooth.

The mobile phone may thus be used to provide tag data to the tag device, read data stored in the tag, or update software in the tag. An app may be installed in the mobile phone for secure communication with the tag. The app may provide a user interface for accessing data from the tag device.

In an embodiment the tag data can comprise an IATA code. The IATA code information may thus be output from the tag. In case of displaying the IATA code information on the display this enables the electronic tag to be used on airports as a replacement for paper bag tags. Besides the IATA code any other information may be part of the tag data and displayed on the display of the tag.

As described above, an electronic tag according to the invention can include an output means, such as a display, IOT module or an RFID transponder, configured to output tag data for retrieval by a receiver in close proximity to the tag. The tag can be configured to receive the tag data from a paired mobile device, such as a mobile phone, smartphone or tablet, using a short distance communication protocol, such as Bluetooth, low energy Bluetooth, RFID or NFC.

The electronic tag device can be configured to transmit tag data using a short distance communication protocol, such as Bluetooth, low energy Bluetooth, RFID or NFC. The tag device can comprise a cellular communication module configured to transmit an indication of a current geographical location to an external sources. The tag can further comprise a microcontroller configured to switch off at least a transmitter part of the communication module in response to one or more signals received from one or more external sources.

Multiple triggers may be used to switch on or off the transmitter part of the cellular communication module. If multiple triggers are used, then typically all triggers must be received before the transmitter part is switched on or off. Examples of multiple triggers are signals received from multiple external sources, a trigger from an accelerometer in combination with one or more signals from one or more external sources, and a trigger from the operational state of the tag in combination with one or more signals from one or more external sources.

Although the invention may advantageously be used in conjunction with airplane safety regulations, the invention is not limited thereto. The tag device of the present invention may advantageously be used in other environments where the transmitter part of the communication module is to be switched off for whatever reason, such as to conserve battery power.

The tag device is arranged for receiving an initial itinerary data via a communications component, wherein the initial itinerary data comprises of at least a preferred communication frequency or band related to a location. The initial itinerary data can be stored in the tags memory. The indication of the current location of the tag can be retrieved. The frequency or band for the communications component can be selected based on the location of the tag. If the communications component is failing to establish communication usning said frequency or band the lased used frequency or band, stored in the memory, can be selected. If failing to establish communication the communications component can search for a frequency or band for establishing communication.

While the invention has been described above with reference to an example involving aircraft, the invnetion is equally useable for transportation of cargo or baggage using other means of transportation such as ship, train or truck. It will be realized by those with skill in the art that the profile of sensor data used to detect whether the item to which the tag is attached is resting, being loaded, or in transit may differ depending on the mode of transportation, the principles remain the same.

The invention claimed is:

1. An electronic tag device for cargo or baggage comprising:
   a housing;
   a microcontroller;
   a memory;
   a wireless communications module;
   a positioning module; and
   a sensor module including at least an accelerometer and an air pressure sensor;
   wherein the microcontroller is configured to
      receive itinerary data via the wireless communications module while the microcontroller is operating in a first mode and store the itinerary data in said memory, said itinerary data including at least a departure time, and an arrival time;
      enter a second mode when at least one of said departure time in said itinerary and sensor data received from the sensor module indicates that the cargo or baggage is in transit, wherein said wireless communications module is disabled in said second mode;
      return to said first mode when both of said arrival time in said itinerary and sensor data received from the sensor module indicates that the cargo or baggage is no longer in transit; and
      communicate with a remote system using said communications module while in said first mode and to turn off all communication while in the second mode; and
   wherein the sensor data is determined by the microcontroller to indicate that the cargo or baggage is in transit or is no longer in transit is based on positioning data, accelerometer data, and air pressure data, wherein the accelerometer data indicates that the cargo or baggage is in transit based on a detected acceleration profile, and wherein the air pressure data indicates that the cargo or baggage is in transit based on a detected change in pressure.

2. The electronic tag device according to claim 1, wherein said wireless communications module includes a first communication capability and a second communication capability, wherein said first communication capability is a wide area network capability which requires predetermined specification of communication parameters, and said second communication capability is communication capability which is capable of detecting communication parameters from an environment and establish communication using said detected communication parameters; and
   wherein said microcontroller is further configured to attempt to establish communication using the first communication capability based on parameters derived from said itinerary subsequent to returning to said first mode, and attempt to establish communication using the second communication capability if the attempt to establish communication using the first communication capability fails.

3. The electronic tag device according to claim 2, wherein said predetermined specification of communication parameters includes at least one of:
   a radio technology standard, a frequency, and a channel.

4. The electronic tag device according to claim 2, wherein said first communication capability is an implementation of a narrowband IoT (NB-IoT) standard.

5. The electronic tag device according to claim 2, wherein said second communication capability is GPRS or EGPRS, or LTE, LTE-M or 5G.

6. The electronic tag device according to claim 1, wherein said sensor module includes at least two sensors, including said accelerometer and said air pressure sensor, that are configured to monitor at least two physical parameters to which the tag is exposed, and said microcontroller is further configured to enter or remain in said second mode based on sensor data received from either one of said at least two sensors independently.

7. The electronic tag device according to claim 1, wherein the sensor module includes at least one sensor chosen from the group consisting of: a thermometer, photosensor, and a vibration sensor.

8. The electronic tag device according to claim 7, wherein the microcontroller is further configured determine whether the sensor data indicates that the cargo or baggage is in transit or is no longer in transit based on at least one of: a detected acceleration profile, a detected change in pressure, a detected change in temperature, a detected change in light conditions, and a detected vibration profile.

9. The electronic tag device according to claim 1, further comprising at least one antenna.

10. The electronic tag device according to claim 1, further comprising a display module.

11. The electronic tag device according to claim 10, wherein the display module has a screen cover in polycarbonate.

12. The electronic tag device according to claim 1, further comprising a power source.

13. The electronic tag device according to claim 12, wherein the power source is rechargeable.

14. The electronic tag device according to claim 1, wherein the positioning module is a GPS module.

15. The electronic tag device according to claim 1, wherein the housing comprises at least a device for establishing a connection between the microcontroller and a back plate.

16. The electronic tag device according to claim 15, wherein the back plate comprises a rechargeable battery and a WIFI module.

17. The electronic tag device according to claim 16, wherein the microcontroller is configured to control the device to operate as a WIFI router using a cellular communications component.

18. A method for controlling a wireless communications module in an electronic tag device attached to cargo or baggage, comprising:
  receiving and storing itinerary data over said wireless communications module while operating in a first mode, said itinerary data including at least a departure time and an arrival time;
  monitoring output from a positioning module and a sensor module including at least an accelerometer and an air pressure sensor;
  entering a second mode when at least one of said departure time in said itinerary and sensor data received from the sensor module indicates that the cargo or baggage is in transit, wherein said wireless communications module is disabled in said second mode; and
  returning to said first mode when both of said arrival time in said itinerary and sensor data received from the sensor module indicate that the cargo or baggage is no longer in transit; and
  communicating with a remote system using said communications module while in said first mode and to turn off all communication while in the second mode;
  wherein determination that the sensor data indicates that the cargo or baggage is in transit or is no longer in transit is made by a microcontroller based on positioning data, accelerometer data, and air pressure data, wherein the accelerometer data indicates that the cargo or baggage is in transit based on a detected acceleration profile, and wherein the air pressure data indicates that the cargo or baggage is in transit based on a detected change in pressure.

19. The method according to claim 18, wherein said wireless communications module includes a first communication capability and a second communication capability, wherein said first communication capability is a wide area network capability which requires predetermined specification of communication parameters, and said second communication capability is communication capability which is capable of detecting communication parameters from an environment and establish communication using said detected communication parameters, the method further comprising:
  attempting to establish communication using the first communication capability based on parameters derived from said itinerary subsequent to returning to said first mode; and
  attempting to establish communication using the second communication capability if the attempt to establish communication using the first communication capability fails.

20. The method according to claim 18, further comprising:
  attempting to establish communication using communication parameters associated with a place of arrival, and if that fails attempting to establish communication using communication parameters associated with a place of departure.

21. The method according to claim 18, further comprising:
  determining a location using the positioning module;
  obtaining communication parameters associated with the determined location from a table stored in local memory; and
  attempting to establish communication using said communication parameters obtained from said table.

* * * * *